(12) United States Patent
Izukawa et al.

(10) Patent No.: US 9,405,407 B2
(45) Date of Patent: Aug. 2, 2016

(54) PROJECTOR

(71) Applicant: Funai Electric Co., Ltd., Daito, Osaka (JP)

(72) Inventors: Shintaro Izukawa, Osaka (JP); Ken Nishioka, Osaka (JP); Atsuhiko Chikaoka, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 97 days.

(21) Appl. No.: 14/291,734

(22) Filed: May 30, 2014

(65) Prior Publication Data

US 2014/0368754 A1    Dec. 18, 2014

(30) Foreign Application Priority Data

Jun. 18, 2013  (JP) .................................. 2013-127890

(51) Int. Cl.
| | | |
|---|---|---|
| *G06F 3/042* | (2006.01) | |
| *G03B 21/14* | (2006.01) | |
| *G06F 3/0346* | (2013.01) | |
| *H04N 9/31* | (2006.01) | |
| *G06F 3/041* | (2006.01) | |

(52) U.S. Cl.
CPC ............ *G06F 3/0425* (2013.01); *G03B 21/147* (2013.01); *G06F 3/0346* (2013.01); *G06F 3/0416* (2013.01); *G06F 3/0421* (2013.01); *G06F 3/0423* (2013.01); *H04N 9/3185* (2013.01)

(58) Field of Classification Search
CPC . G03B 21/147; H04N 9/3185; H04N 9/3194; H04N 9/3129; G06F 3/0346; G06F 3/03545; G06F 3/0421; G06F 3/0423

USPC ......... 353/69, 70, 42; 345/156, 173, 175, 182
See application file for complete search history.

(56) References Cited

U.S. PATENT DOCUMENTS

| | | | |
|---|---|---|---|
| 2008/0158547 A1 | 7/2008 | Cheng et al. | |
| 2010/0001998 A1 | 1/2010 | Mandella et al. | |
| 2010/0013860 A1* | 1/2010 | Mandella ............... | G01B 21/04 345/650 |

(Continued)

FOREIGN PATENT DOCUMENTS

| | | |
|---|---|---|
| EP | 2570891 A1 | 3/2013 |
| JP | 4872525 B | 2/2012 |

OTHER PUBLICATIONS

Extended European Search Report of the corresponding European Application No. 14171094.7, dated Oct. 9, 2014.

*Primary Examiner* — William C Dowling
(74) *Attorney, Agent, or Firm* — Global IP Counselors, LLP (57) ABSTRACT

A projector includes a light source, a projection component, a photodetector, and an inclination calculator. The light source outputs light. The projection component projects an image on a projection surface by scanning the light outputted by the light source at an angle to the projection surface. The photodetector detects, as a reflected light, the light that has been scanned by the projection component and reflected by a detection object within a light detection range of the photodetector. The light detection range is set to a predetermined range in a direction perpendicular to the projection surface. The inclination calculator calculates an inclination angle of the detection object in a sub-scanning direction of the light based on a position of the detection object on the projection surface and a number of times the reflected light is detected while scanning in the sub-scanning direction.

18 Claims, 8 Drawing Sheets

(56) References Cited

U.S. PATENT DOCUMENTS

| | | |
|---|---|---|
| 2011/0267262 A1 | 11/2011 | Gollier |
| 2013/0070232 A1* | 3/2013 | Izukawa .............. G06F 3/0304 356/51 |
| 2014/0145930 A1* | 5/2014 | Mandella .............. G01B 21/04 345/156 |
| 2014/0300583 A1* | 10/2014 | Izukawa .............. H04N 9/3129 345/175 |
| 2014/0354599 A1* | 12/2014 | Chikaoka .............. G06F 3/0425 345/175 |

* cited by examiner

| | 11 | 12 | 13 | ... | 37 | 38 | 39 | 40 |
|---|---|---|---|---|---|---|---|---|
| (0,0) | θ1 | θ2 | θ3 | ... | θ4 | θ5 | θ6 | θ7 |
| (0,1) | θ8 | θ9 | θ10 | ... | θ11 | θ12 | θ13 | θ14 |
| ... | ... | ... | ... | ... | ... | ... | ... | ... |
| (1999,999) | θ15 | θ16 | θ17 | ... | θ18 | θ19 | θ20 | θ21 |

| | 11 | 12 | 13 | ... | 37 | 38 | 39 | 40 |
|---|---|---|---|---|---|---|---|---|
| (0,0)-(99,99) | θ1 | θ2 | θ3 | ... | θ4 | θ5 | θ6 | θ7 |
| (100,0)-(199,99) | θ8 | θ9 | θ10 | ... | θ11 | θ12 | θ13 | θ14 |
| ... | ... | ... | ... | ... | ... | ... | ... | ... |
| (1900,900)-(1999,999) | θ15 | θ16 | θ17 | ... | θ18 | θ19 | θ20 | θ21 |

PROJECTOR

CROSS-REFERENCE TO RELATED APPLICATIONS

This application claims priority to Japanese Patent Application No. 2013-127890 filed on Jun. 18, 2013. The entire disclosure of Japanese Patent Application No. 2013-127890 is hereby incorporated herein by reference.

BACKGROUND

1. Field of the Invention

The present invention generally relates to a projector. More specifically, the present invention relates to a projector for detecting a position of a detection object, such as a touch pen.

2. Background Information

Conventionally, a projector is well known in the art that projects a laser beam on a projection surface (see Japanese Patent No. 4,872,525 (Patent Literature 1), for example). The projector includes a laser light source that outputs light with a red component (R), a laser light source that outputs light with a green component (G), and a laser light source that outputs light with a blue component (B). The light outputted from these laser light sources is guided to the projection surface, thereby projecting an image on the projection surface. When an image is projected onto the projection surface of a desktop, for example, and the user touches the projection surface with a touch pen, a finger, or another such detection object, the position of the detection object is detected by detecting the light that is outputted from the laser light sources and reflected by the detection object.

SUMMARY

With the conventional projector, the position of the detection object can be detected, but the inclination angle of the detection object cannot be calculated. It has been discovered that if the inclination angle of the detection object can be calculated, then the detection object can be used to input various kinds of information.

One aspect is to provide a projector for calculating the inclination angle of a detection object that contacts with a projection surface.

In view of the state of the known technology, a projector includes a light source, a projection component, a photodetector, and an inclination calculator. The light source is configured to output light. The projection component is configured to project an image on a projection surface by scanning the light outputted by the light source at an angle to the projection surface. The photodetector is configured to detect, as a reflected light, the light that has been scanned by the projection component and reflected by a detection object within a light detection range of the photodetector. The light detection range is set to a predetermined range in a direction perpendicular to the projection surface. The inclination calculator is configured to calculate an inclination angle of the detection object in a sub-scanning direction of the light based on a position of the detection object on the projection surface and a number of times the reflected light is detected while scanning in the sub-scanning direction.

Also other objects, features, aspects and advantages of the present disclosure will become apparent to those skilled in the art from the following detailed description, which, taken in conjunction with the annexed drawings, discloses one embodiment of the projector.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents. Specifically, the numerical values, shapes, materials, constituent elements, layout positions and connection mode of the constituent elements, steps, the order of steps and so forth described in the following embodiments are provided all just for illustration only and not for the purpose of limiting the the invention. The invention is merely defined by the appended claims. Of the constituent elements in the following embodiments, those not discussed in an independent claim are not necessarily required, but will be described for understanding of the embodiments.

First Embodiment

Overall Configuration

Figure 1:
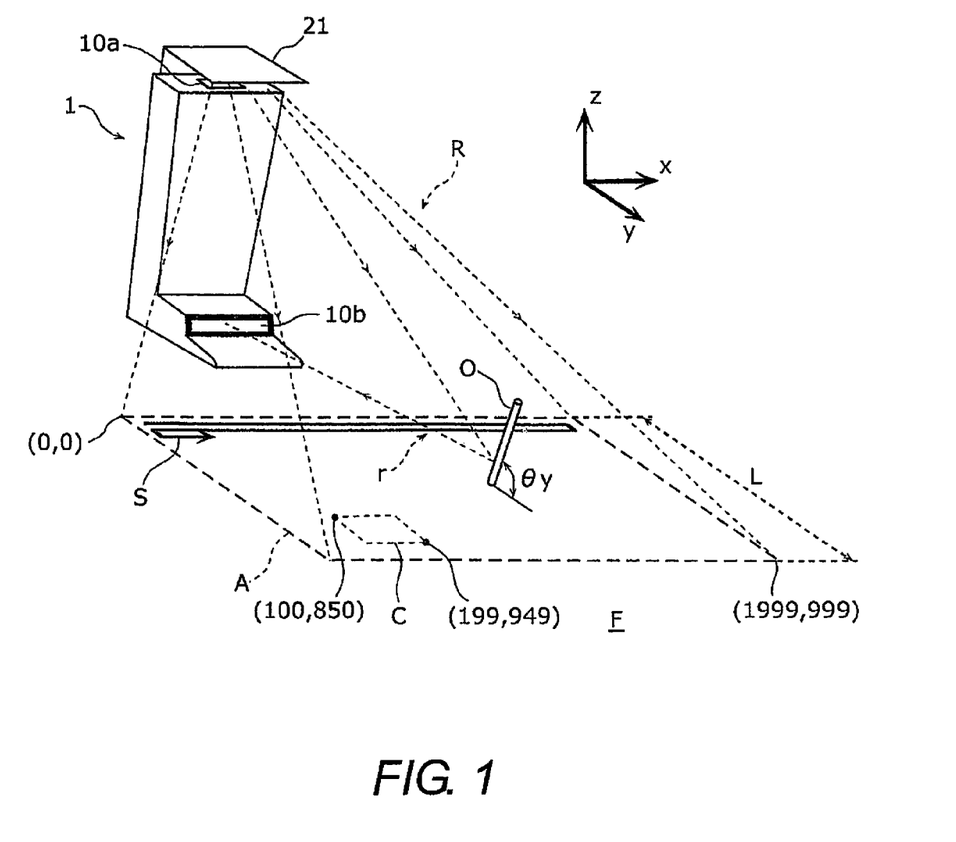
FIG. 1 is a perspective view of a projector in accordance with a first embodiment.

Referring initially to FIG. 1, a projector 1 is illustrated in accordance with a first embodiment. FIG. 1 is a perspective view of the projector 1.

The projector 1 is a device for projecting an image on a projection surface A by scanning a laser beam R over the projection surface A, which is part of a floor F. The laser beam R is emitted through an emission opening 10a, reflected by a mirror 21, and guided to the projection surface A. When the user touches a touch pen or other detection object O to the projection surface A, the reflected light r at the detection object O of the laser beam R goes through an incident opening 10b into the interior of the projector 1. The projector 1 detects the inclination in the y axis direction and the position of the detection object O on the projection surface A based on the reflected light r incident from the incident opening 10b. The method for detecting the position and inclination of the detection object O will be discussed below.

Figure 2:
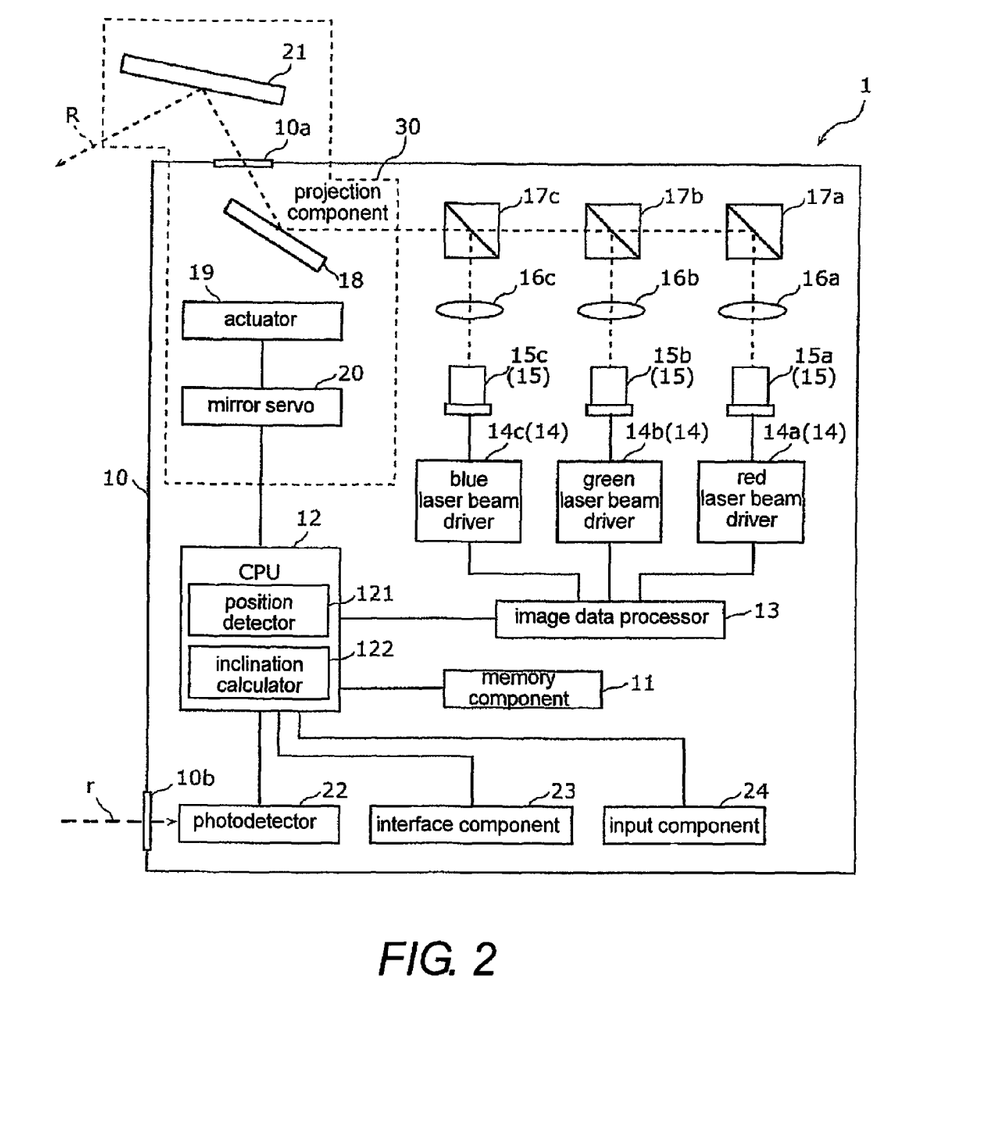
FIG. 2 is a block diagram of the hardware configuration of the projector.

FIG. 2 is a block diagram of the hardware configuration of the projector 1. The projector 1 includes a memory component 11, a CPU (central processing unit) 12, an image data processor 13, a laser driver 14 (a red laser beam driver 14a, a green laser beam driver 14b, and a blue laser beam driver 14c), a light source 15 (a red laser beam light source 15a, a green laser beam light source 15b, and a blue laser beam light source 15c), lenses 16a to 16c, beam splitters 17a to 17c, a projection component 30, a photodetector 22, an interface component 23, and an input component 24.

The projection component 30 projects an image on the projection surface A by scanning the laser beam emitted by the light source 15 at an angle to the projection surface A. For example, as shown by the arrow S in FIG. 1, the laser beam R is scanned from the side near the projector 1 toward the far side. The size of the image is 2000×1000 pixels, for example, and the projection component 30 scans the laser beam R 1000 times in the sub-scanning direction (e.g., 1000 lines). The main scanning direction and the sub-scanning direction will now be described. The main scanning direction refers to the principle scanning direction of the laser beam R, and in FIG. 1 the x direction is the main scanning direction of the laser beam R. The sub-scanning direction, meanwhile, is a direction perpendicular to the main scanning direction, and in FIG. 1 the y direction is the sub-scanning direction of the laser beam R.

The projection component 30 includes a MEMS (micro-electro-mechanical system) mirror 18, an actuator 19, a mirror servo 20, and the mirror 21.

The memory component 11 stores a data table (discussed below) that is used to calculate the inclination angle of the detection object O, as well as data about the image projected onto the projection surface A.

The image data processor 13 produces drive signals for a red laser beam, a green laser beam, and a blue laser beam corresponding to the pixel values of the various pixels, based on the image data.

The red laser beam driver 14a drives the red laser beam light source 15a based on a drive signal for a red laser beam produced by the image data processor 13, and a red laser beam is emitted from the red laser beam light source 15a. The green laser beam driver 14b drives the green laser beam light source 15b based on a drive signal for a green laser beam produced by the image data processor 13, and a green laser beam is emitted from green laser beam light source 15b. The blue laser beam driver 14c drives the blue laser beam light source 15c based on a drive signal for a blue laser beam produced by the image data processor 13, and a blue laser beam is emitted from the blue laser beam light source 15c.

The lens 16a is disposed along the optical path of the red laser beam between the red laser beam light source 15a and the beam splitter 17a. The lens 16b is disposed along the optical path of the green laser beam between the green laser beam light source 15b and the beam splitter 17b. The lens 16c is disposed along the optical path of the blue laser beam between the blue laser beam light source 15c and the beam splitter 17c.

The beam splitter 17a changes the optical path of the red laser beam that has passed through the lens 16a, and guides this light to the beam splitter 17b. The beam splitter 17b changes the optical path of the green laser beam that has passed through the lens 16b, and also transmits the red laser beam guided from the beam splitter 17a. Consequently, the beam splitter 17b guides to the beam splitter 17c a laser beam that is a combination of the red laser beam and the green laser beam. The beam splitter 17c changes the optical path of the blue laser beam that has passed through the lens 16c, and also transmits a laser beam that is a combination of the red laser beam and the green laser beam guided from the beam splitter 17b. Consequently, the beam splitter 17c guides to the MEMS mirror 18 the laser beam R that is a combination of the red laser beam, the green laser beam, and the blue laser beam. The laser beam R is reflected by the MEMS mirror 18 and transmitted through the emission opening 10a, after which it is again reflected by the mirror 21 and guided to the projection surface A.

The mirror servo 20 and the actuator 19 drive the MEMS mirror 18, and change the inclination of the MEMS mirror 18 so that the laser beam R scans at high speed in the direction of the arrow S over the projection surface A. The mirror servo 20 controls the inclination of the MEMS mirror 18 via the actuator 19 under instructions from the CPU 12. An image can be projected on the projection surface A by scanning the laser beam R at high speed in the direction of the arrow S over the projection surface A.

The photodetector 22 detects the reflected light r from the detection object O of the laser beam R scanned by the projection component 30. The photodetector 22 is limited in the detection range of light to within a predetermined range in a direction perpendicular to the projection surface A. That is, the photodetector 22 receives the reflected light r transmitted through the incident opening 10b, so the height of the reflected light r that can be detected by the photodetector 22 is limited.

The CPU 12 detects the position and calculates the inclination angle of the detection object O. The CPU 12 includes a position detector 121 and an inclination calculator 122 as processors that are functionally realized in the execution of a program.

The position detector 121 detects as the position of the detection object O the projection position of the laser beam R by the projection component 30 at the point in time when the reflected light r was first detected by the photodetector 22. For example, if the photodetector 22 detects the reflected light r at the point when the laser beam R is being projected at the position of the coordinates (x1, y1) on the projection surface A, then the coordinates (x1, y1) are detected as the position of the detection object O.

The inclination calculator 122 calculates the inclination angle of the detection object O in the sub-scanning direction from the position of the detection object O on the projection surface A and the number of times the reflected light r has been detected in the sub-scanning direction of the laser beam R. The principle behind the method for calculating the inclination angle will be discussed below.

The interface component 23 is used to connect the projector 1 with an external device. The input component 24 is a processor for inputting instructions to the CPU 12.

Of the constituent components of the projector 1 described above, all but the mirror 21 are housed in the interior of a housing 10.

Principle of Calculating Inclination Angle of Detection Object O

Figure 3:
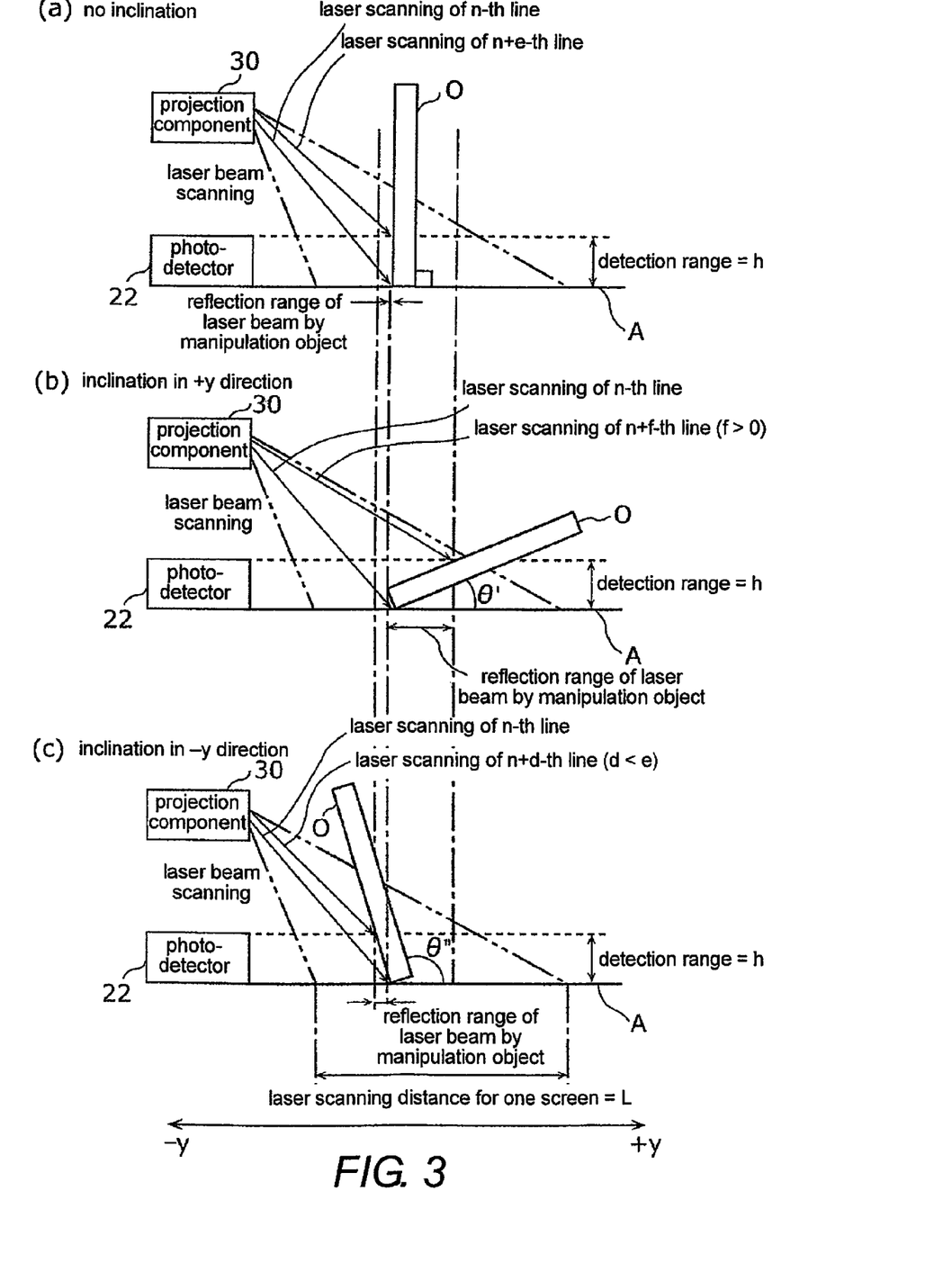
FIG. 3 is a diagram illustrating the principle behind a method for calculating the inclination angle of a detection object.

Next, the principle behind the method for calculating the inclination angle of the detection object O by the inclination calculator 122 will be described. In FIG. 3, a portion (a) is a diagram of the positional relation between the detection object O and the projector 1 when the detection object O is disposed perpendicular to the projection surface A. A portion (b) in FIG. 3 is a diagram of the positional relation between the detection object O and the projector 1 when the detection object O is inclined in the Y axis positive direction. That is, the angle θ' formed by the projection surface A and the detection object O is less than 90 degrees. A portion (c) in FIG. 3 is a diagram of the positional relation between the detection object O and the projector 1 when the detection object O is inclined in the Y axis negative direction. That is, the angle θ' formed by the projection surface A and the detection object O is greater than 90 degrees. The detection range of the reflected light r by the photodetector 22 in a direction perpendicular to the projection surface A is limited to the height h. Because the laser beam R is scanned in the direction of the arrow S in FIG. 1, the scanning is performed from the left side to the right side in FIG. 3.

As shown in the portion (a) in FIG. 3, the laser beam R from the n-th line to the n+e-th line is reflected by the detection object O within the detection range, and this reflected light r is detected by the photodetector 22. As shown in the portion (b) in FIG. 3, the laser beam R from the n-th line to the n+f-th line is reflected by the detection object O within the detection range, and this reflected light r is detected by the photodetector 22. As shown in the portion (c) in FIG. 3, the laser beam R from the n-th line to the n+d-th line is reflected by the detection object O within the detection range, and this reflected light r is detected by the photodetector 22. In the illustrated embodiment, e, f and d are positive value, and f is larger than e, while d is smaller than e.

Figure 4:
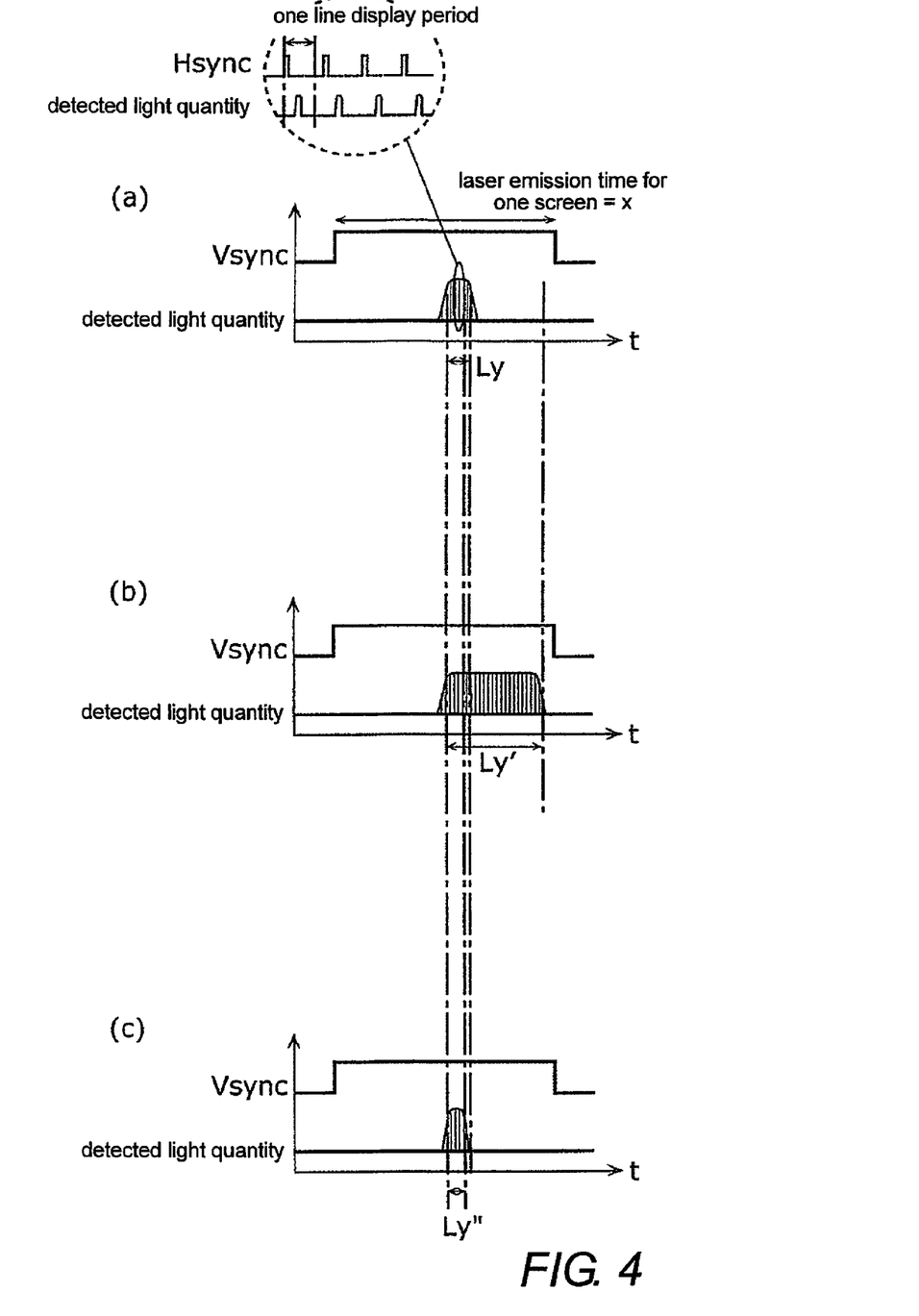
FIG. 4 is a graph of the change in light quantity detected by a photodetector of the projector.

In FIG. 4, portions (a) to (c) are graphs of the change in the light quantity detected by the photodetector 22 in the cases of portions (a) to (c) in FIG. 3. The horizontal axis is time, and the vertical axis is the detected light quantity. The photodetector 22 detects the quantity of the reflected light r within one vertical synchronization (Vsync) period. The portion (a) in FIG. 4 also includes a detail view of the portion indicated by the broken-line circle. In this detail view, a horizontal synchronization signal (Hsync) is also shown. While the laser beam R is being projected onto the detection object O within the detection range, the quantity of the reflected light r is detected for each horizontal line. For example, in the case of the portion (a) in FIG. 3, the (e+1) laser beams R are projected onto the detection object O within the detection range from the start of scanning of the n-th line of the laser beam R until the end of scanning of the n+e-th line of the laser beam R. Accordingly, the quantity of the reflected light r of the (e+1) beams is detected by the photodetector 22. The photodetector 22 detects the reflected light r whose light quantity exceeds a specific threshold, as the detection of the reflected light r.

A comparison of the portions (a) and (b) in FIG. 3 shows that more scanned light hits the detection object O within the detection range of the photodetector 22 in the case shown in the portion (b). Accordingly, the number of times the reflected light r in the sub-scanning direction is detected is larger in the case shown in the portion (b). Thus, as shown in the portions (a) and (b) in FIG. 4, the detection time of the reflected light r is such that the detection time Ly' in the portion (b) is longer than the detection time Ly in the portion (a).

On the other hand, a comparison of the portions (a) and (c) in FIG. 3 shows that more scanned light hits the detection object O within the detection range of the photodetector 22 in the case shown in the portion (c). Accordingly, the number of times the reflected light r in the sub-scanning direction is detected is smaller in the case shown in the portion (c). Thus, as shown in the portions (a) and (c) in FIG. 4, the detection time of the reflected light r is such that the detection time Ly" in the portion (c) is longer than the detection time Ly in the portion (a).

Thus, the more the detection object O is inclined away from the projection component 30 (in the Y axis positive direction), the more times the reflected light r is detected in the sub-scanning direction. Also, the more the detection object O is inclined toward the projection component 30 (in the Y axis negative direction), the fewer times the reflected light r is detected in the sub-scanning direction. Thus, the inclination angle of the detection object O can be calculated based on the number of times the reflected light r has been detected in the sub-scanning direction. Since the laser beam R is incident at an angle on the projection surface A, even though the inclination angle of the detection object O is the same, the number of times the reflected light r is detected will vary according to the position of the detection object O. Accordingly, the inclination angle of the detection object O can be calculated accurately by using not just the number of times the reflected light r has been detected, but also the position of the detection object O.

Figure 5:
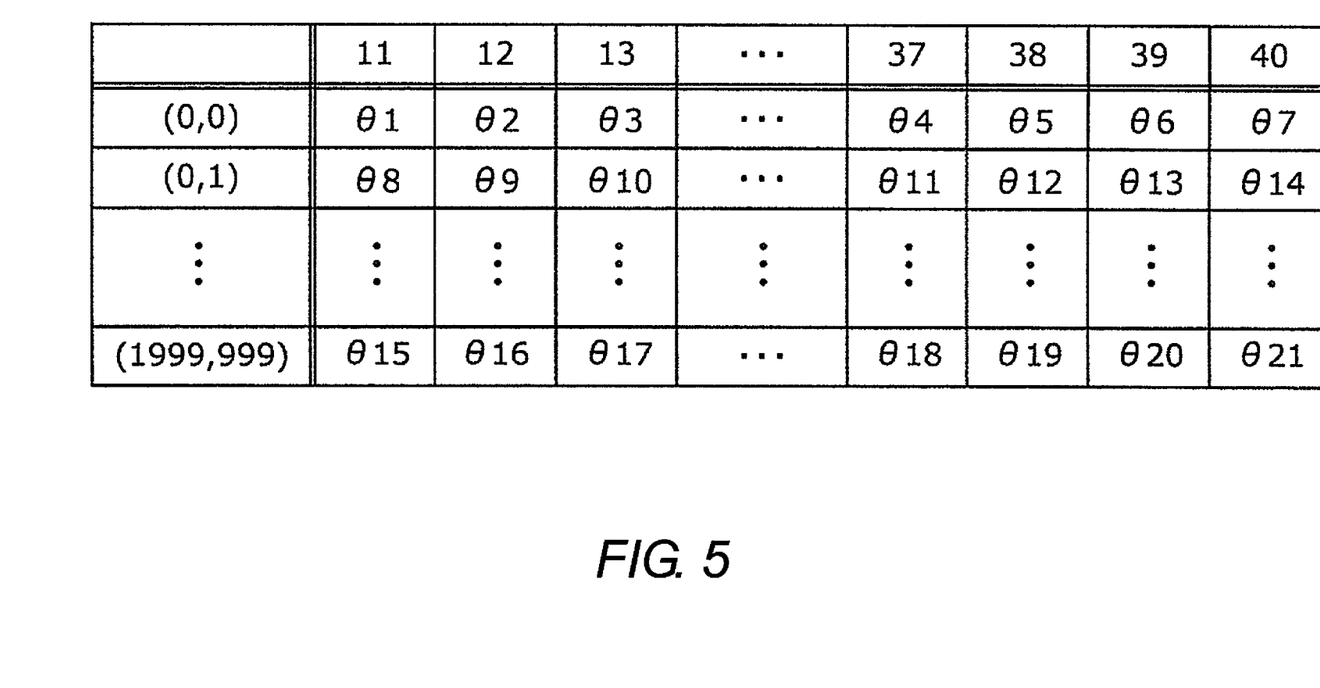
FIG. 5 is a data table stored in a memory component of the projector.

FIG. 5 is a data table stored in the memory component 11 of the projector 1. The data table contains data indicating the relation between the inclination angle of the detection object O, the number of times the reflected light r has been detected, and the position of the detection object O on the projection surface A. For instance, if the detection object O is touching at position of (0, 0) in the image projected on the projection surface A, and the number of times the reflected light r has been detected here is 11, then the inclination angle of the detection object O in the y axis direction is θ1.

Processing Executed by Projector

Figure 6:
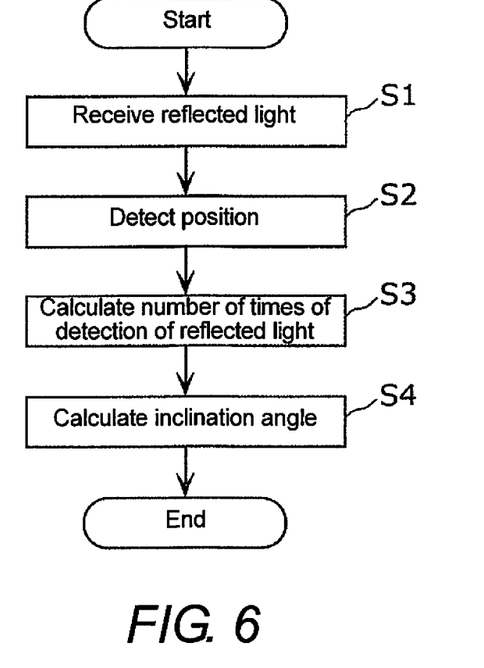
FIG. 6 is a flowchart of processing to calculate the inclination angle of the detection object with the projector.

FIG. 6 is a flowchart of processing to calculate the inclination angle of the detection object O with the projector 1.

The photodetector 22 receives the reflected light r (step S1).

The position detector 121 detects, as the position of the detection object O, the position of the laser beam R projected by the projection component 30 on the projection surface A at the point in time when the reflected light r was first detected within one vertical synchronization period (within one frame period) (step S2).

After this, the inclination calculator 122 calculates the number of times the reflected light r has been detected within one frame period (step S3).

The inclination calculator 122 refers to the data table (FIG. 5) stored in the memory component 11 to calculate the inclination angle of the detection object O in the y axis direction from the position of the detection object O detected in step S2 and the number of times the reflected light r has been detected, which was calculated in step S3 (step S4).

Example of Manipulation of Detection Object O

Figure 7:
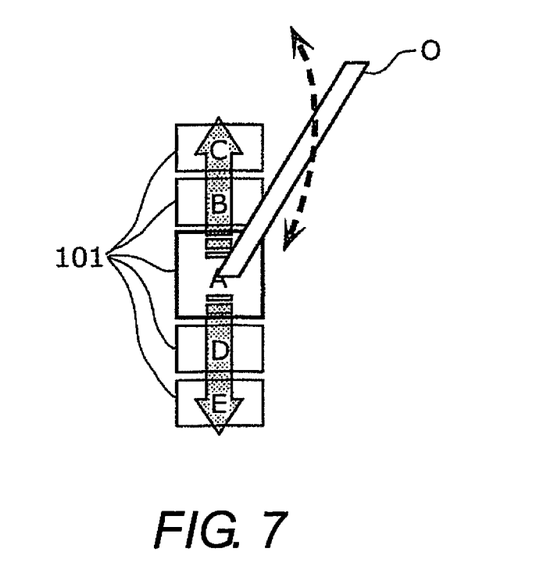
FIG. 7 is a diagram illustrating an example of a manipulation of the detection object.

Next, an example of the manipulation of the detection object O will be described. In this example, of five images 101, from the image A to the image E shown in FIG. 7, only the image A is originally displayed on the projection surface A. At this point the user can perform a manipulation that is the same as a flick manipulation by inclining the detection object O in the y axis direction on the projection surface A. If the detection object O is inclined upward in FIG. 7 on the projection surface A, for example, then the image data processor 13 produces an image B that is adjacent to the image A. Also, the image data processor 13 can further produce an image C that is adjacent to the image B when the detection object O is further inclined upward in FIG. 7 on the projection surface A. Alternatively, the projection component 30 can display the image B instead of the image A on the projection surface A. On the other hand, if the detection object O is inclined downward in FIG. 7 on the projection surface A, for example, then the image data processor 13 produces an image D that is adjacent to the image A. Also, the image data processor 13 can further produce an image E that is adjacent to the image D when the detection object O is further inclined upward in FIG. 7 on the projection surface A. Alternatively, the projection component 30 can display the image D instead of the image A on the projection surface A.

Effect

As described above, with projector 1 in accordance with the first embodiment, the inclination angle of the detection object O can be calculated accurately.

Also, since the inclination angle of the detection object O can be detected by referring to the data table, the inclination angle of the detection object can be calculated by simple processing.

Second Embodiment

A projector 1 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. As shown in FIG. 5, the data table used by the projector 1 in accordance with the first embodiment gives the relation between the inclination angle of the detection object O and the number of times the reflected light r has been detected, for each coordinate of the image projected on the projection surface A. The projector 1 in accordance with the second embodiment differs from the projector 1 in accordance with the first embodiment in the data table that is used. The rest of the configuration is the same as in the first embodiment, and will not be described again in detail.

Figure 8:
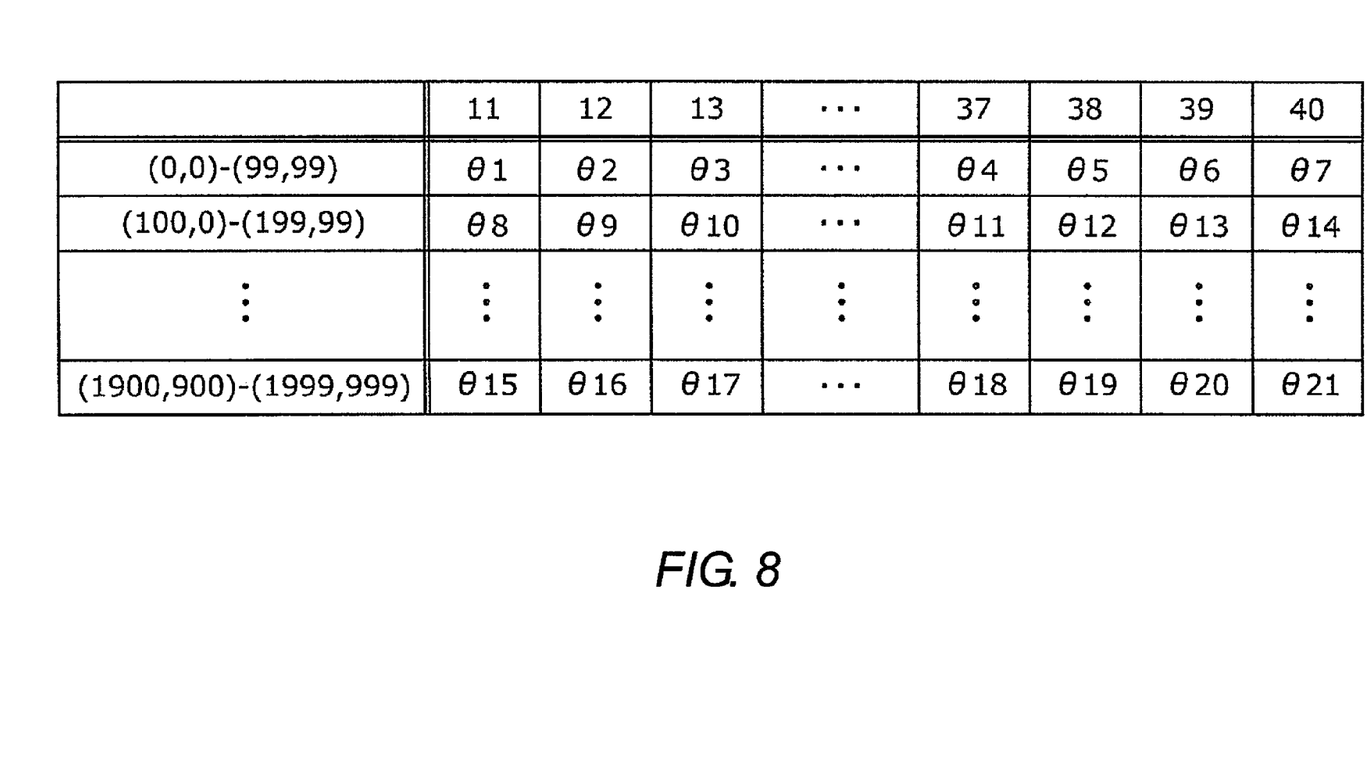
FIG. 8 is a data table stored in a memory component of a projector in accordance with a second embodiment.

FIG. 8 is a data table stored in a memory component 11 (see FIG. 2) of the projector 1 in accordance with the second embodiment. This data table contains data indicating the relation between the inclination angle of the detection object O and the number of times the reflected light r has been detected, for each of a plurality of regions on the projection surface A. For instance, if the detection object O is touching in a region where the lower-right corner coordinates are (99, 99) and the upper-left corner coordinates are (0, 0) in the image projected on the projection surface A, and the number of times the reflected light r has been detected here is 11, then the inclination angle of the detection object O in the y axis direction is θ1.

FIG. 6 illustrates a flowchart of the processing to calculate the inclination angle of the detection object O with the projector 1 in accordance with the first embodiment. The processing to calculate the inclination angle of the detection object O in accordance with the second embodiment is basically identical to the processing in accordance with the first embodiment shown in FIG. 6. However, the second embodiment differs in that the data table referred to in the processing in step S4 is the one shown in FIG. 8. That is, in step S4, an inclination calculator 122 (see FIG. 2) of the projector 1 in accordance with the second embodiment refers to the data table stored in the memory component 11 (FIG. 8) to calculate the inclination angle of the detection object O in the y axis direction based on the number of times the reflected light r has been detected in step S3 and the region of the projection surface A to which the position of the detection object O detected in step S2 belongs (step S4).

As described above, the data size of the data table in the second embodiment can be smaller than that in the first embodiment.

Third Embodiment

A projector 1 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. In the first embodiment, the inclination angle of the detection object O is calculated at every position of the projection surface A. However, the third embodiment differs from the first embodiment in that the inclination angle of the detection object O is calculated only when the detection object O is touching in a predetermined region on the projection surface A.

Only the parts that differ from the first embodiment will be described below, and parts that are shared with the first embodiment will not be described again.

For example, as shown in FIG. 1, an inclination calculation region C is preset in part of the projection surface A. In the illustrated embodiment, the inclination calculation region C is set as the region in which the upper-left corner coordinates are (100, 850) and the lower-right corner coordinates are (199, 949) in an image projected on the projection surface A. Of course, the inclination calculation region C is shown in FIG. 1, the projectors 1 in accordance with the first and second embodiments does not need to have this inclination calculation region C.

In the illustrated embodiment, an inclination calculator 122 of the projector 1 in accordance with the third embodiment calculates the inclination angle of the detection object O when the detection object O is positioned within the inclination calculation region C, and does not calculate the inclination angle of the detection object O when the detection object O is positioned outside the inclination calculation region C.

Figure 9:
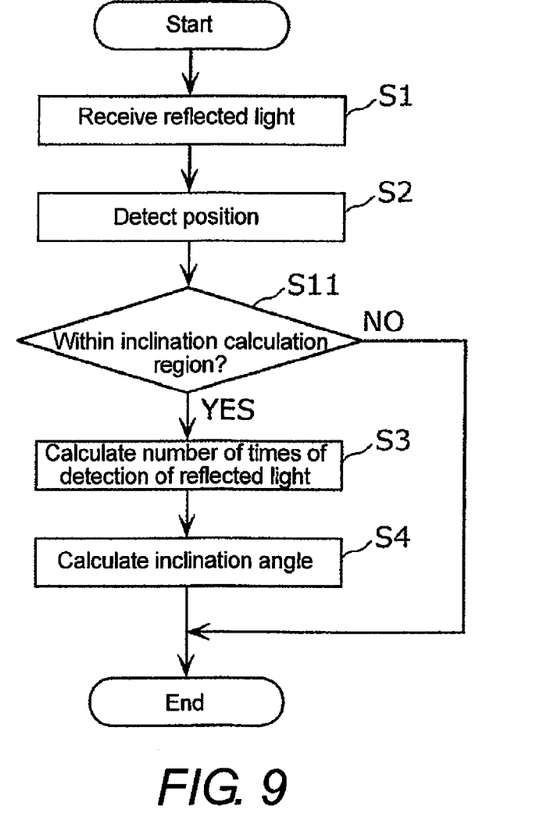
FIG. 9 is a flowchart of processing to calculate the inclination angle of a detection object with a projector in accordance with a third embodiment.

FIG. 9 is a flowchart of processing to calculate the inclination angle of the detection object O with the projector 1 in accordance with the third embodiment. The flowchart shown in FIG. 9 adds the processing of step S11 to the flowchart shown in FIG. 6. The processing of steps S1, S2, S3, and S4 in FIG. 9 is the same as steps S1, S2, S3, and S4 in FIG. 6 described in the first embodiment, and therefore will not be described again. The inclination calculator 122 determines whether or not the position of the detection object O detected in the position detection processing (step S2) is included in the inclination calculation region C (step S11).

If the detection object O is positioned within the inclination calculation region C (Yes in step S11), then the inclination calculator 122 executes the processing of steps S3 and S4 to calculate the inclination angle of the detection object O. If the detection object O is positioned outside the inclination calculation region C (No in step S11), then the inclination calculator 122 does not calculate the inclination angle of the detection object O.

Figure 10:
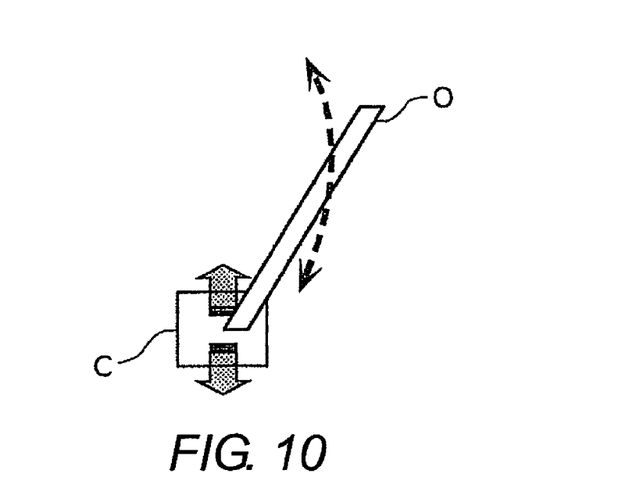
FIG. 10 is a diagram illustrating an example of a manipulation of the detection object.

As shown in FIG. 10, for example, the inclination calculator 122 calculates the inclination angle of the detection object O if the detection object O is positioned within the inclination calculation region C, and does not calculate the inclination angle of the detection object O if the detection object O is positioned outside the inclination calculation region C. This allows the place where the inclination angle is calculated to be limited within the inclination calculation region C. As shown in FIG. 10, for example, the user can use the detection object O like a joystick by inclining the detection object O forward and backward within the inclination calculation region C.

As described above, with the third embodiment, the place where the inclination angle is calculated can be set to within the inclination calculation region C.

The projectors 1 in accordance with the first to third embodiments of the present invention are described above, but the present invention is not limited to or by these embodiments.

For example, in the first to third embodiments, the laser beam R is scanned from the side near the projector 1 toward the far side as indicated by the arrow S in FIG. 1, but the laser beam R can instead be scanned from the side farthest from the projector 1 toward the near side.

Also, the memory component 11, the CPU 12, the image data processor 13, the interface component 23, and the input component 24 of the above-mentioned projector 1 can more specifically be formed as a computer system made up of a microprocessor, a ROM, a RAM, a hard disk drive, a display unit, a keyboard, a mouse, and so forth. Computer programs can be stored in the RAM or on the hard disk drive. The microprocessor operates according to a computer program, so that the position detector 121 and the inclination calculator 122 included in the CPU 12, and the image data processor 13 achieve their function. The "computer program" here is made up of a combination of a plurality of command codes that give instructions to a computer in order to achieve a specific function.

Furthermore, these processors can be formed by a single system LSIC (large scale integrated circuit). A system LSIC is a super-multifunctional LSIC manufactured by integrating a plurality of components on a single chip, and more specifically is a computer system that includes a microprocessor, a ROM, a RAM, etc. Computer programs are stored in the RAM. The system LSIC achieves its function when the microprocessor operates according to a computer program.

These processors can also be formed by a single module or an IC card that can be inserted into and removed from the projector 1. This module or IC card is a computer system made up of a microprocessor, a ROM, a RAM, etc. The module or IC card can also include the above-mentioned super-multifunctional LSIC. When the microprocessor operates according to a computer program, the module or IC card achieves its function. This module or IC card can be tamper resistant.

The present invention can also be the methods discussed above. The present invention can also be a computer program with which the above-mentioned methods are carried out by a computer, or a digital signal formed of the above-mentioned computer program.

Furthermore, the present invention can be such that the above-mentioned computer program or the above-mentioned digital signal is recorded to a permanent recording medium that can be read by a computer, such as a flexible disk, a hard disk, a CD-ROM, an MO, a DVD, a DVD-ROM, a DVD-RAM, a BD (Blu-ray™ Disc), or a semiconductor memory. It can also be the above-mentioned digital signal that is recorded to one of these permanent recording media.

The present invention can also be such that the above-mentioned computer program or the above-mentioned digital signal is transmitted via an electrical communications line, a wireless or wired communications line, a network (such as the Internet), data broadcast, etc.

The present invention can also be a computer system including a microprocessor and a memory, in which the memory stores the above-mentioned computer program, and the microprocessor operates according to the above-mentioned computer program.

Also, the present invention can be realized by another, independent computer system, if the above-mentioned program or the above-mentioned digital signal is recorded to one of the above-mentioned permanent recording media and transferred, or if the above-mentioned computer program or the above-mentioned digital signal is transferred via the above-mentioned network, etc.

Furthermore, the above embodiments and the above modification examples can be combined with each other. For instance, in the third embodiment, the inclination angle of the detection object O can be calculated by using the data table from the second embodiment (FIG. 8).

The present invention can be applied to a projector or the like that projects onto a projection surface an image outputted by a personal computer, for example.

With the projector in accordance with one aspect of the present invention includes a light source, a projection component, a photodetector, and an inclination calculator. The light source is configured to output light. The projection component is configured to project an image on a projection surface by scanning the light outputted by the light source at an angle to the projection surface. The photodetector is configured to detect, as a reflected light, the light that has been scanned by the projection component and reflected by a detection object within a light detection range of the photodetector. The light detection range is limited to a predetermined range in a direction perpendicular to the projection surface. The inclination calculator is configured to calculate an inclination angle of the detection object in a sub-scanning direction of the light based on a position of the detection object on the projection surface and a number of times the reflected light is detected while scanning in the sub-scanning direction.

If the case when the detection object is positioned perpendicular to the projection surface and the case when the detection object is inclined in a direction going away from the projection component in the sub-scanning direction are compared, then in the latter case, more scan lines of the light hit the detection object within the detection range of the photodetector. Accordingly, the more the detection object is inclined away from the projection component, the more times the reflected light will be detected in the sub-scanning direction. Also, if the case when the detection object is positioned perpendicular to the projection surface and the case when the detection object is inclined in a direction going closer to the projection component in the sub-scanning direction are compared, then fewer scan lines of the light hit the detection object within the detection range of the photodetector. Accordingly, the more the detection object is inclined toward the projection component, the fewer times the reflected light will be detected in the sub-scanning direction. Thus, the inclination angle of the detection object can be calculated based on the number of times the reflected light is detected in the sub-scanning direction. Since the light is incident on the projection surface at an angle, even though the inclination angle of the detection object is the same, the number of times the reflected light is detected will vary with the position of the detection object. Accordingly, the inclination angle of the detection object can be accurately calculated by using not only the number of times the reflected light is detected, but also the position of the detection object.

The photodetector can be further configured to detect the reflected light while light quantity of the light reflected by the detection object exceeds a specific threshold.

With this configuration, the reflected light can be detected from the quantity of reflected light. Accordingly, the reflected light can be detected with a single photodetector.

Also, the inclination calculator can be further configured to calculate the inclination angle of the detection object in the sub-scanning direction based on the position of the detection object on the projection surface and the number of times the reflected light is detected while scanning in the sub-scanning direction by referring to a data table that has a relation between the inclination angle of the detection object, the position of the detection object and the number of times the reflected light is detected.

With this configuration, the inclination angle of the detection object can be detected by referring to the data table. Accordingly, the inclination angle of the detection object can be calculated by simple processing.

Also, the data table can have the relation between the inclination angle of the detection object and the number of times the reflected light is detected, for each of a plurality of regions on the projection surface. The inclination calculator can be further configured to refer to the data table to calculate the inclination angle of the detection object in the sub-scanning direction based on the number of times the reflected light is detected in the sub-scanning direction and the region on the projection surface to which the position of the detection object on the projection surface belongs.

With this configuration, the data size of the data table can be reduced.

Also, an inclination calculation region can be set in part of the projection surface. The inclination calculator can be further configured to calculate the inclination angle of the detection object while the detection object is positioned within the inclination calculation region. The inclination calculator can be further configured not to calculate the inclination angle of the detection object while the detection object is positioned outside the inclination calculation region.

With this configuration, the place where the inclination angle is calculated can be limited to within the inclination calculation region.

Also, the projector can further include a position detector that is configured to detect, as the position of the detection object, a projection position of light output by the projection component at a timing when the photodetector first detects the reflected light while the projection component scans the light outputted by the light source in a direction away from the projection component along the sub-scanning direction on the projection surface.

When the light is scanned in the direction away from the projection component, the light will hit the detection object from the position closest to the projection surface. Therefore, the light projection position at the timing when the reflected light from the detection object is first detected can be detected as the position of the detection object.

The present invention can be worked not only as a projector including these characteristic processors, but also as an inclination detection method in which steps include processing executed by the characteristic processors of this projector. It can also be worked as a program for causing a computer to function as the characteristic processors of this projector, or as a program that causes a computer to execute the characteristic steps of this inclination detection method. It should go without saying that this program can be distributed via a communications network such as the Internet, or a permanent recording medium that can be read by a computer, such as a CD-ROM (compact disc—read only memory).

With the present invention, the inclination angle of the detection object contacting with the projection surface can be detected.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a projector in an upright position. Accordingly, these directional terms, as utilized to describe the projector should be interpreted relative to a projector in an upright position on a horizontal surface. Also, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A projector comprising:
   a light source that outputs light;
   a projection component that projects an image on a projection surface by scanning the light outputted by the light source at an angle to the projection surface;
   a photodetector that detects the light that has been scanned by the projection component and reflected by a detection object within a light detection range of the photodetector, with the light detection range being set to a predetermined range in a direction perpendicular to the projection surface; and
   an inclination detector that detects an inclination angle of the detection object in a predetermined direction of the light based on a position of the detection object on the projection surface and a number of times the light is detected while scanning in the predetermined direction.
2. The projector according to claim 1, wherein
   the photodetector detects the light while light quantity of the light reflected by the detection object exceeds a specific threshold.

3. The projector according to claim 1, wherein
the inclination detector detects the inclination angle of the detection object in the predetermined direction based on the position of the detection object on the projection surface and the number of times the light is detected while scanning in the predetermined direction by referring to a data table that has a relation between the inclination angle of the detection object, the position of the detection object and the number of times the light is detected.

4. The projector according to claim 3, wherein
the data table has the relation between the inclination angle of the detection object and the number of times the light is detected, for each of a plurality of regions on the projection surface, and
the inclination detector refer to the data table to detect the inclination angle of the detection object in the predetermined direction based on the number of times the light is detected in the predetermined direction and the region on the projection surface to which the position of the detection object on the projection surface belongs.

5. The projector according to claim 1, wherein
an inclination detection region is set in part of the projection surface,
the inclination detector detects the inclination angle of the detection object while the detection object is positioned within the inclination detection region, and
the inclination detector does not detect the inclination angle of the detection object while the detection object is positioned outside the inclination detection region.

6. The projector according to claim 1, further comprising
a position detector that detects, as the position of the detection object, a projection position of the light output by the projection component at a timing when the photodetector first detects the light while the projection component scans the light outputted by the light source in a direction away from the projection component along the predetermined direction on the projection surface.

7. The projector according to claim 1, wherein
the photodetector that detects the light larger number of times in a case that the detection object is inclined away from the projection component relative to the projection surface than in a case that the detection object is perpendicular to the projection surface.

8. The projector according to claim 1, wherein
the photodetector that detects the light smaller number of times in a case that the detection object is inclined towards the projection component relative to the projection surface than in a case that the detection object is perpendicular to the projection surface.

9. The projector according to claim 1, wherein
the predetermined direction is a vertical scanning direction of the light.

10. A projector comprising:
a light source;
a projection component that projects an image on a projection surface by scanning light outputted by the light source;
a photodetector that detects the light that has been scanned by the projection component and reflected by a detection object; and
an inclination detector that detects an inclination angle of the detection object in a predetermined direction of the light based on a position of the detection object on the projection surface and a number of times the light is detected while scanning in the predetermined direction.

11. The projector according to claim 10, wherein
the photodetector detects the light while light quantity of the light reflected by the detection object exceeds a specific threshold.

12. The projector according to claim 10, wherein
the inclination detector detects the inclination angle of the detection object in the predetermined direction based on the position of the detection object on the projection surface and the number of times the light is detected while scanning in the predetermined direction by referring to a data table that has a relation between the inclination angle of the detection object, the position of the detection object and the number of times the light is detected.

13. The projector according to claim 12, wherein
the data table has the relation between the inclination angle of the detection object and the number of times the light is detected, for each of a plurality of regions on the projection surface, and
the inclination detector refers to the data table to detect the inclination angle of the detection object in the predetermined direction based on the number of times the light is detected in the predetermined direction and the region on the projection surface to which the position of the detection object on the projection surface belongs.

14. The projector according to claim 10, wherein
an inclination detection region is set in part of the projection surface,
the inclination detector detects the inclination angle of the detection object while the detection object is positioned within the inclination detection region, and
the inclination detector does not detect the inclination angle of the detection object while the detection object is positioned outside the inclination detection region.

15. The projector according to claim 10, further comprising
a position detector that detects, as the position of the detection object, a projection position of the light output by the projection component at a timing when the photodetector first detects the light while the projection component scans the light outputted by the light source in a direction away from the projection component along the predetermined direction on the projection surface.

16. The projector according to claim 10, wherein
the photodetector that detects the light larger number of times in a case that the detection object is inclined away from the projection component relative to the projection surface than in a case that the detection object is perpendicular to the projection surface.

17. The projector according to claim 10, wherein
the photodetector that detects the light smaller number of times in a case that the detection object is inclined towards the projection component relative to the projection surface than in a case that the detection object is perpendicular to the projection surface.

18. The projector according to claim 10, wherein
the predetermined direction is a vertical scanning direction of the light.

* * * * *